US006625728B1

United States Patent
Ahrens et al.

(10) Patent No.: US 6,625,728 B1
(45) Date of Patent: Sep. 23, 2003

(54) METHOD AND APPARATUS FOR LOCATING AND DISPLAYING A DEFECTIVE COMPONENT IN A DATA PROCESSING SYSTEM DURING A SYSTEM STARTUP USING LOCATION AND PROGRESS CODES ASSOCIATED WITH THE COMPONENT

(75) Inventors: George Henry Ahrens, Pflugerville, TX (US); George John Dawkins, Austin, TX (US); Michael Youhour Lim, Leander, TX (US); Thomas Francis Ploski, Tucson, AZ (US); David Lee Randall, Leander, TX (US); Daniel John Ribbentrop, Sr., Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/431,797

(22) Filed: Nov. 2, 1999

(51) Int. Cl.[7] .............................. G06F 1/26; G06F 1/28; G06F 1/30; G06F 15/177
(52) U.S. Cl. .............................. 713/2; 713/1; 713/330; 713/310; 713/340; 713/300
(58) Field of Search .............................. 713/1, 2, 100, 713/300, 330, 340, 310; 714/25, 31, 41; 710/104

(56) References Cited

U.S. PATENT DOCUMENTS

| | | | | |
|---|---|---|---|---|
| 4,936,419 A | * | 6/1990 | Stadler et al. | 187/393 |
| 5,081,626 A | * | 1/1992 | Scott | 714/724 |
| 5,491,631 A | * | 2/1996 | Shirane et al. | 340/439 |
| 5,758,155 A | * | 5/1998 | Circenis | 713/2 |
| 5,778,006 A | * | 7/1998 | Mukai et al. | 714/25 |
| 5,916,286 A | * | 6/1999 | Seashore et al. | 701/29 |
| 6,044,411 A | * | 3/2000 | Berglund et al. | 713/1 |
| 6,100,887 A | * | 8/2000 | Bormann et al. | 345/440 |
| 6,167,463 A | * | 12/2000 | Arp et al. | 710/10 |
| 6,170,025 B1 | * | 1/2001 | Drottar et al. | 709/201 |
| 6,269,417 B1 | * | 7/2001 | Mahalingam | 710/104 |
| 6,370,606 B1 | * | 4/2002 | Bonola | 710/260 |
| 6,381,694 B1 | * | 4/2002 | Yen | 713/1 |
| 2001/0042225 A1 | * | 11/2001 | Cepulis et al. | 714/25 |

FOREIGN PATENT DOCUMENTS

JP 63274325 A * 11/1988 ............. G06F/1/00

OTHER PUBLICATIONS

Chan, J.C.; "An improved technique for circuit board interconnect test", Instrumentation and Measurement, IEEE Transactions on, vol.: 41 Issue: 5 Oct. 1992, pp.: 692–698.*

* cited by examiner

Primary Examiner—Thomas Lee
Assistant Examiner—James K. Trujillo
(74) Attorney, Agent, or Firm—Mark E. McBurney; Bracewell & Patterson, L.L.P.

(57) ABSTRACT

A method for locating a defective component in a data processing system during system startup is disclosed. Each component within the data processing system is assigned a location code. Then, a progress code is associated with a location code and a function being loaded to, tested, or executed in a component. After supplying power to the data processing system, the components of the data processing system are initialized and tested to establish a configuration. During the initialization and testing, a location code of a component and a corresponding progress code are displayed on a display panel. In response to a system hang, a defective component can be identified utilizing the location code and the progress code displayed on the display panel.

9 Claims, 4 Drawing Sheets

METHOD AND APPARATUS FOR LOCATING AND DISPLAYING A DEFECTIVE COMPONENT IN A DATA PROCESSING SYSTEM DURING A SYSTEM STARTUP USING LOCATION AND PROGRESS CODES ASSOCIATED WITH THE COMPONENT

BACKGROUND OF THE INVENTION

1. Technical Field

The present invention relates to a method and apparatus for data processing in general, and in particular to a method and apparatus for locating a defective component in a data processing system. Still more particularly, the present invention relates to a method and apparatus for locating a defective component in a data processing system during system startup.

2. Description of the Prior Art

A data processing system typically undergoes a series of initialization procedures at system startup. At startup or "cold boot," each of the various hardware components of the data processing system first performs its own internal reset procedures to obtain a known stable state. Once these hardware reset procedures have completed successfully, each component of the data processing system will start a Logical Built-in Self-Test (LBIST) or an Array Built-in Self-Test (ABIST). A service processor then performs a LBIST or ABIST signature verification against a know signature value. Once the verification is complete, the service processor starts to initialize each component of the data processing system.

Next, firmware is executed to complete the initialization process. In many data processing systems, this firmware includes Power-On-Self-Test (POST) software that surveys and performs sanity checks on the system hardware, a Basic Input Output System (BIOS) that interfaces processor(s) to key peripherals such as a keyboard and display monitor, and an operating system loader (bootstrap) program that launches execution of a selected operating system. These basic firmware procedures, which are often bundled together in a startup flash memory, enable the data processing system to obtain an operating state at which the data processing system is available to execute a user's applications.

During the execution of the firmware, the firmware typically interacts with one specific component within the data processing system at a time. When a system "hang" occurs during startup, there is a high probability that the cause of the system "hang" is related to the component that the firmware or the service processor is accessing at the time. Without any additional knowledge, the identification of the source of error is typically accomplished by replacing each adaptor card in the data processing system to determine whether or not the adaptor card causes a system "hang." This procedure is very time-consuming and error-prone. Consequently, it would be desirable to provide an improved method for locating a defective component in a data processing system during system startup.

SUMMARY OF THE INVENTION

In accordance with a preferred embodiment of the present invention, each component within a data processing system is assigned a location code. Then, a progress code is associated with a location code and a function being loaded to or executed in a component. After supplying power to the data processing system, the components of the data processing system are initialized to establish a configuration. During the initialization, a location code of a component and a corresponding progress code are displayed on a display panel. In response to a system hang, a defective component can be identified utilizing the location code and the progress code displayed on the display panel.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
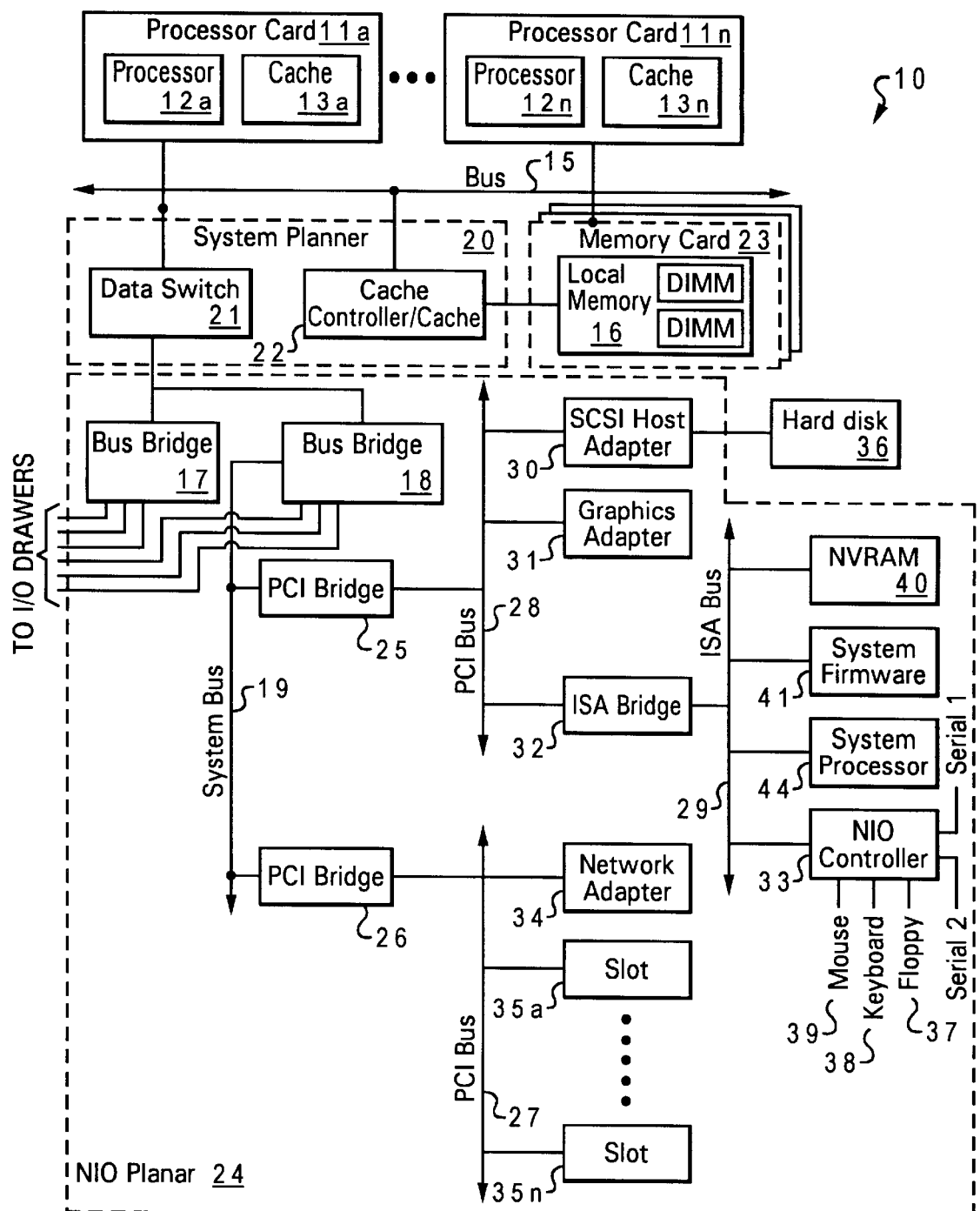
FIG. 1 is a block diagram of an illustrative embodiment of a data processing system with which the present invention may advantageously be utilized.

Referring now to the drawings and in particular to FIG. 1, there is depicted a block diagram of an illustrative embodiment of a data processing system with which the present invention may advantageously be utilized. As shown, a data processing system 10 includes processor cards 11a–11n. Each of processor cards 11a–11n includes a processor and a cache memory. For example, processor card 11a contains a processor 12a and a cache memory 13a, and processor card 11n contains a processor 12n and a cache memory 13n.

Processor cards 11a–11n are connected to a main bus 15. Main bus 15 supports a system planar 20 that contains a data switch 21 and a memory controller/cache 22. Memory controller/cache 22 supports a memory card 23 that includes a local memory 16 having two dual in-line memory modules (DIMMs).

Data switch 21 connects to a bus bridge 17 and a bus bridge 18 located within a native I/O (NIO) planar 24. As shown, bus bridge 18 connects to peripheral components interconnect (PCI) bridges 25 and 26 via a system bus 19. PCI bridge 25 connects to a variety of I/O devices via a PCI bus 28. As shown, a hard disk 36 may be connected to PCI bus 28 via a small computer system interface (SCSI) host adapter 30. A graphics adapter 31 may be directly or indirectly connected to PCI bus 28. PCI bridge 26 provides connections for external data streams through a network adapter 34 and adaptor card slots 35a–35n via a PCI bus 27.

An industry standard architecture (ISA) bus 29 connects to PCI bus 28 via an ISA bridge 32. ISA bridge 32 provides interconnection capabilities through an NIO controller 33 having serial connections 1 and 2. A floppy drive connection 37, a keyboard connection 38, and a mouse connection 39 are provided by NIO controller 33 to allow data processing system 10 to accept data input from a user via a corresponding input device. In addition, a non-volatile RAM (NVRAM) 40 provides a non-volatile memory for preserving certain types of data from system disruptions or system failures, such as power supply problems. A system firmware 41 is also connected to ISA bus 29 for implementing the initial Basic Input/Output System (BIOS) functions. A service processor 44 connects to ISA bus 29 to provide functionality for system diagnostics or system servicing.

Figure 2:
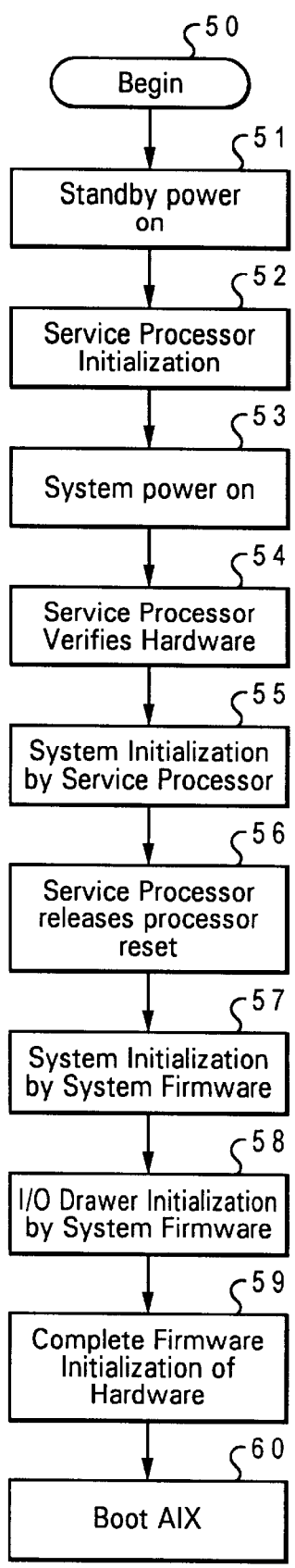
FIG. 2 is a high-level logic flow diagram of a method for performing system startup in the data processing system from FIG. 1, in accordance with a preferred embodiment of the present invention.

Referring now to FIG. 2, there is depicted a high-level logic flow diagram of a method for performing system startup in data processing system 10, in accordance with a preferred embodiment of the present invention. For ease of illustration, the system startup process has been illustrated in a sequential manner; however, as will be apparent to a person of ordinary skill in the art from the following description, many of the illustrated steps may be performed in a different order than those shown in FIG. 2 or may be performed concurrently.

Beginning at block 50, standby power for the system is turned on, as shown in block 51. Then, the initialization of service processor 44 begins, as depicted in block 52. This initialization may entail service processor 44 performing certain low level hardware tests, and preferably includes service processor 44 executing firmware stored in a service processor memory that completes the check of service processor 44. Then, power for the system is turned on, as illustrated in block 53. Next, service processor 44 verifies hardware, as shown in block 54. System initialization is then performed by service processor 44, as depicted in block 55.

Next, service processor 44 releases processors reset, as shown in block 56. At this point of the initialization process, the responsibility for performing the remainder of the initialization procedures is transferred from service processor 44 to system firmware 41. Accordingly, as depicted at block 57, processors, such as processors 12a–12n, begin to execute system firmware 41 in order to perform the remainder of the initialization procedures, which include a determination of the present hardware configuration of data processing system 10. The hardware configuration of data processing system 10 is defined to include the components present in data processing system 10, the interconnections between the components, and the accessibility of the components to the operating system. As indicated in block 58, the process of transferring control between the initialization firmware executed by service processor 44 and system firmware 41 executed by the processors includes the initialization firmware passing to system firmware 41 the power information (or a pointer to the power information) indicating the number of I/O drawers detected by the power control firmware.

Next, system firmware 41 executed by processors 12a–12n commences the remainder of the initialization procedures, including initializing I/O drawers, as depicted at block 58. In addition to checking if I/O drawers are properly installed, system firmware 41 further checks to determine if communication can be established with each installed I/O device, such as a LAN adapter, a SCSI controller, etc. After the completion of firmware initialization, as shown in block 59, system firmware 41 then boots the operating system, such as Advanced Interactive executive (AIX) available from International Business Machines Corporation of Armonk, N.Y., from a storage device, such as hard disk 36, as depicted in block 60. Thereafter, data processing system 10 continues operation under the control of the operating system.

Service processor 44 detects errors and passes information to the operating system. The source of the errors may or may not be known to a reasonable certainty at the time that the error is detected. The operating system may merely log the errors against system planar 20. For example, boot-time errors, severe intermittent problems, and adverse environmental computing conditions, such as conditional bandwidth bottlenecks, may be logged by service processor 44 into an error report buffer (not shown). These errors are eventually output and reported in some form, either to hard disk 36 or one or many types of backup systems. Each detected error may result in the generation of an error record comprising a time-stamp at the time of detection, detailed data pertinent to the failing function, including physical location code, symptom bits, etc. Further analysis may be done at a later time if the error logs are stored in an error log file or error log buffer containing the data that some problem determination procedures may require for analysis.

The manner of logging and processing a detected error may depend on the type of error and when the error occurs, e.g., whether the error occurs during system initialization procedures. If an error is detected during system initialization, all devices, components or services within data processing system 10 may not have been initialized. For example, if an error is detected during system initialization, system firmware 41 may present certain errors to a system operator by writing error codes or error message to a liquid crystal display (LCD) panel, a light emitted display (LED), or a system display monitor physically connected to data processing system 10 without being able to log error derived data to the system log file. In other cases, the action of logging the data may start problem determination procedures in the operating system automatically.

As a preferred embodiment of the present invention, each component within data processing system 10 is assigned a location code. In addition, each task of the system startup procedures is assigned a progress code. The progress code preferably has four characters. The progress codes can also be divided into subgroups for each task. This allows one progress code to support many different components within data processing system 10 without having to add new progress codes.

During the system startup, each location code is associated with a specific progress code where function is being loaded from or executed against a specific component. Then, if an error that causes a system hang occurs during the system startup, the progress code (indicating the function being executed or tested) and the location code (indicating the component being tested) are displayed on the LCD display panel to facilitate the process of locating the defective component.

Figure 3:
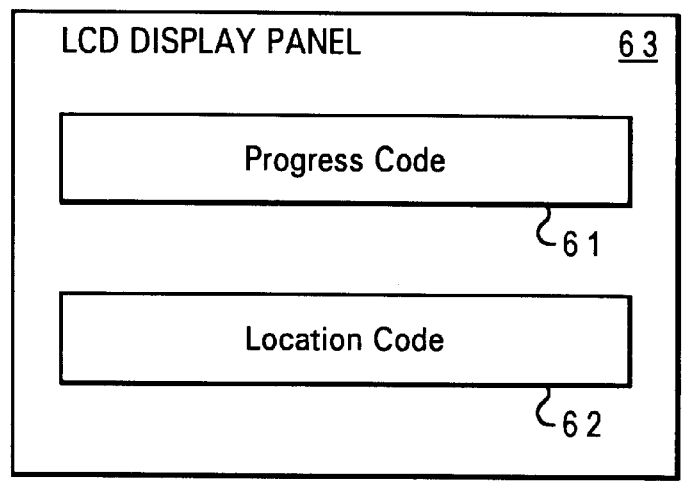
FIG. 3 is a pictorial illustration of a display panel displaying a progress code and a location code, in accordance with a preferred embodiment of the present invention.

As illustrated in FIG. 3, a progress code 61 is preferably displayed on the first line of an LCD display panel 63 and a location code 62 is preferably displayed on the second line of LCD display panel 63. Each time system firmware 41 accesses a new component, the location code is updated accordingly to reflect the component being accessed or tested by system firmware 41. For example, if the progress code for loading Vital Product Data (VPD) from a component is $E050_{hex}$, with the present invention, one progress code represents the function that is being performed by system firmware 41 (such as read VPD), and the location code indicates that the component the VPD is being accessed from (such as a processor, a DIMM, or a PCI card). If a failure occurs that causes the system to hang, the progress code describes the function being performed (such as reading VPD) and the location code indicates the component being accessed at the time the system hang occurred.

With the above-mentioned information, specific service actions can be defined in a Service Guide to direct a service person to replace the FRU associated with the location code as the most probable FRU to be repaired. In most cases, the above-mentioned information eliminates the need to resort to the minimum configuration to attempt to resolve system hangs during system startup. As a result, the outage time associated with repairing a system hang during system startup is significantly reduced and the overall system availability is increased.

Figure 4:
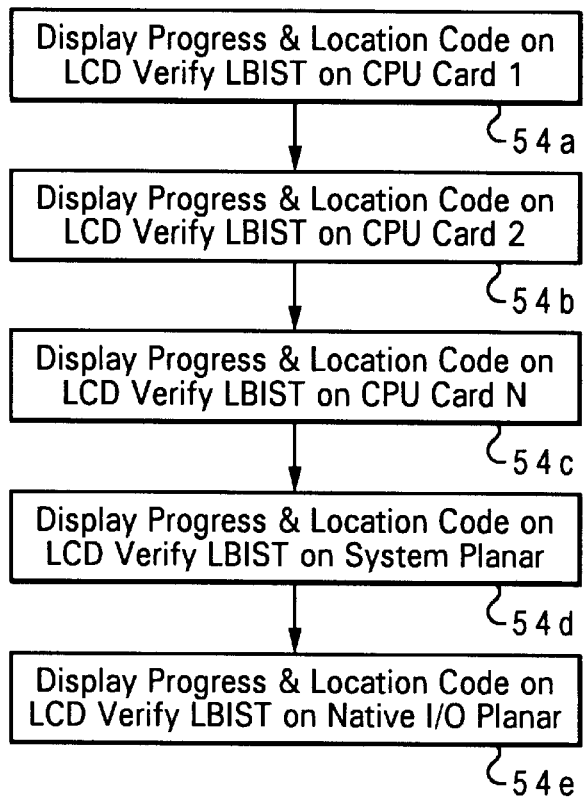
FIG. 4 is a high-level logic flow diagram of a method for implementing the display of progress and location code during the verification step shown in FIG. 2, in accordance with a preferred embodiment of the present invention.

With reference now to FIG. 4, there is depicted a high-level logic flow diagram of a method for implementing the display of progress and location codes during the verification step shown in block 54 of FIG. 2, in accordance with a preferred embodiment of the present invention. As shown, for example, progress and location codes for LBIST verification on processor card 11a are displayed on LCD display panel 63; then, the LBIST verification is performed on processor card 11a, as shown in block 54a. Next, progress and location codes for LBIST verification on processor card 11b are displayed on LCD display panel 63; then, the LBIST verification is performed on processor card 11b, as depicted in block 54b. Similarly, progress and location code for LBIST verification on processor card 11n are displayed on LCD display panel 63; then, the LBIST verification is performed on processor card 11n, as illustrated in block 54c. Then, progress and location codes for LBIST verification on system planar 20 are displayed on LCD display panel 63, and then the LBIST verification is performed on system planar 20, as depicted in 54d. Finally, progress and location codes for LBIST verification on NIO planar 24 are displayed on LCD display panel 63, and then the LBIST verification is performed on NIO planar 24, as depicted in 54e.

Figure 5:
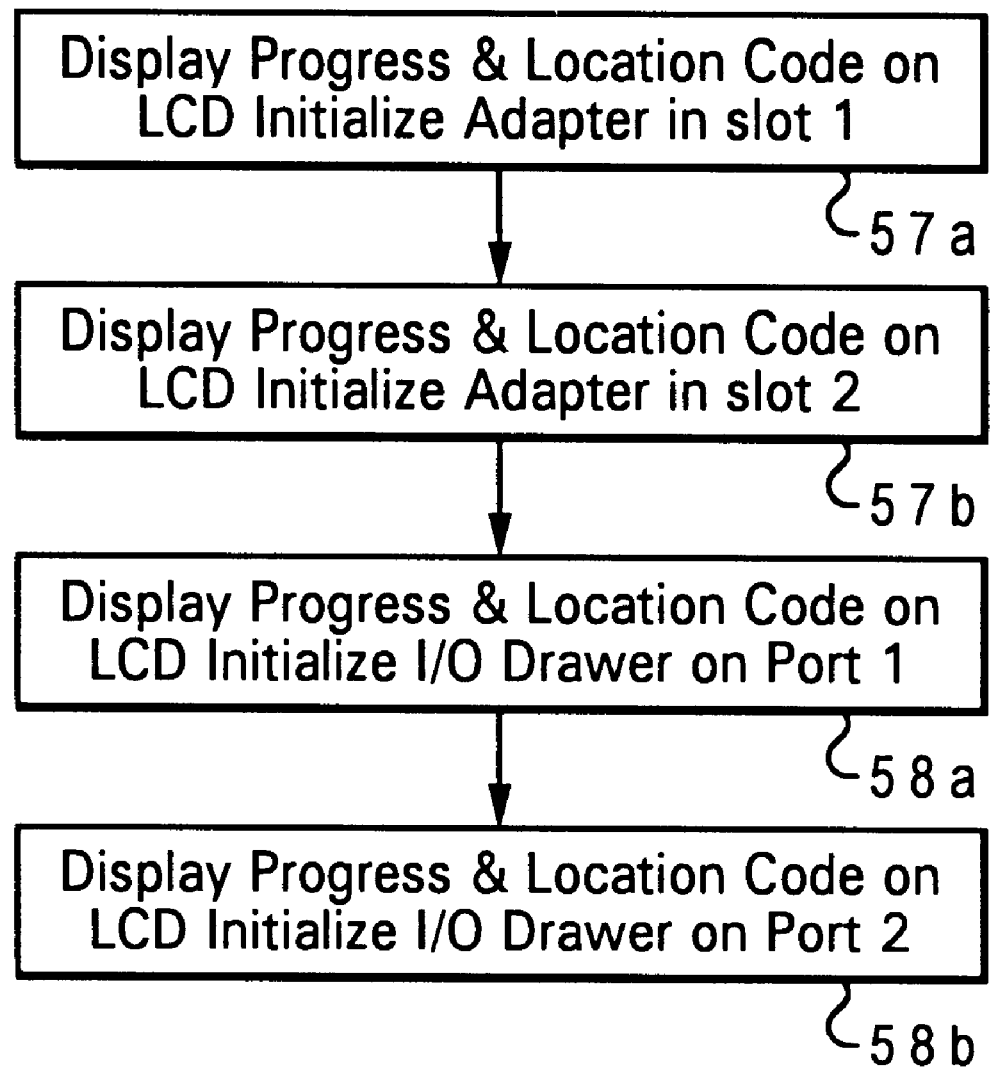
FIG. 5 is a high-level logic flow diagram of a method for implementing the display of progress and location code during the initialization steps shown in FIG. 2, in accordance with a preferred embodiment of the present invention.

Referring now to FIG. 5, there is depicted a high-level logic flow diagram of a method for implementing the display of progress and location codes during the initialization steps shown in blocks 57 and 58 of FIG. 2, in accordance with a preferred embodiment of the present invention. As shown, for example, progress and location codes for initialization of an adapter in slot 35a are displayed on LCD display panel 63; then, the adapter in slot 35a is initialized, as shown in block 57a. Similarly, progress and location codes for initialization of an adapter in slot 35n are displayed on LCD display panel 63, and then the adapter in slot 35n is initialized, as depicted in block 57b. Next, progress and location codes for initialization of an I/O drawer on port 1 are displayed on LCD display panel 63, and then the I/O drawer on port 1 is initialized, as shown in block 58a. Similarly, progress and location codes for initialization of an I/O drawer on port 2 are displayed on LCD display panel 63, and then the I/O drawer on port 2 is initialized, as shown in block 58b.

As has been described, the present invention provides an improved method for locating a defective component in a data processing system during system startup. The present invention provides a progress code and a location code that identify a component that is being accessed or tested by the system firmware. The posting of the progress code and the location code of the component on a display panel provides a mechanism to identify the probable source of error that causes a system hang during system startup.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for locating a defective component in a data processing system during system startup, said method comprising:

assigning each component within said data processing system a respective location code;

associating a progress code with each function being loaded from or executed in a component:

supplying power to components of said data processing system;

initializing components of the data processing system to establish a configuration;

displaying a location code of a component on a display panel during said initialization; and in response to a system hang, retaining the location code displayed on said display panel to facilitate locating a defective component.

2. The method according to claim 1, wherein said method further includes a step of displaying a progress code corresponding to a location code on said display panel during said initialization.

3. The method according to claim 2, wherein said method further includes a step of retaining the progress code displayed on said display panel to facilitate locating said defective component.

4. An apparatus for locating a defective component in a data processing system during system startup, said apparatus comprising:

means for assigning each component within said data processing system a respective location code;

means for associating a progress code with each function being loaded from or executed in a component:

means for supplying power to components of said data processing system;

means for initializing components of the data processing system to establish a configuration;

a display panel for displaying a location code of a component during said initialization; and means for retaining the location code displayed on said display panel to facilitate locating a defective component, in response to a system hang.

5. The apparatus according to claim 4 wherein said display panel further displays a progress code corresponding to a location code during said initialization.

6. The apparatus according to claim 5, wherein said apparatus further includes a means for retaining the progress code displayed on said display panel to facilitate locating said defective component.

7. A computer program product residing on a computer usable medium for locating a defective component in a data processing system during system startup, said computer program product comprising:

program code means for assigning each component within said data processing system a respective location code;

program code means for associating a progress code with each function being loaded from or executed in a component;

program code means for supplying power to components of said data processing system;

program code means for initializing components of the data processing system to establish a configuration;

program code means for displaying the location code of a component on a display panel during said initialization; and program code means for retaining a location code displayed on said display panel to facilitate locating a defective component, in response to a system hang.

8. The computer program product according to claim 7, wherein said computer program product further includes program code means for displaying a progress code corresponding to a location code on said display panel during said initialization.

9. The computer program product according to claim 8, wherein said computer program product further includes program code means for retaining the progress code displayed on said display panel to facilitate locating said defective component.

* * * * *